No. 759,399. PATENTED MAY 10, 1904.
J. L. SHEPPARD.
BALE COMPRESS.
APPLICATION FILED MAR. 31, 1900.
NO MODEL. 4 SHEETS—SHEET 1.
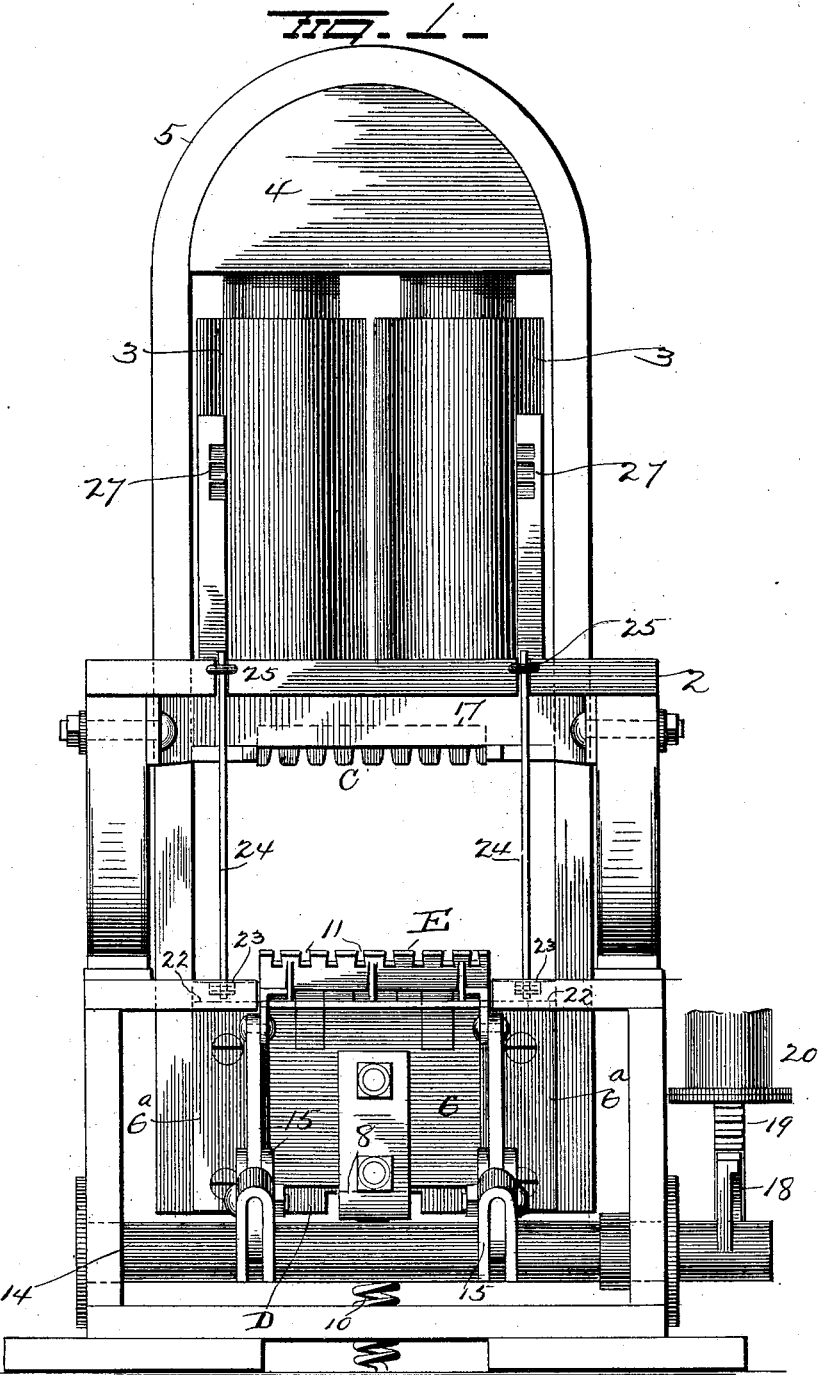

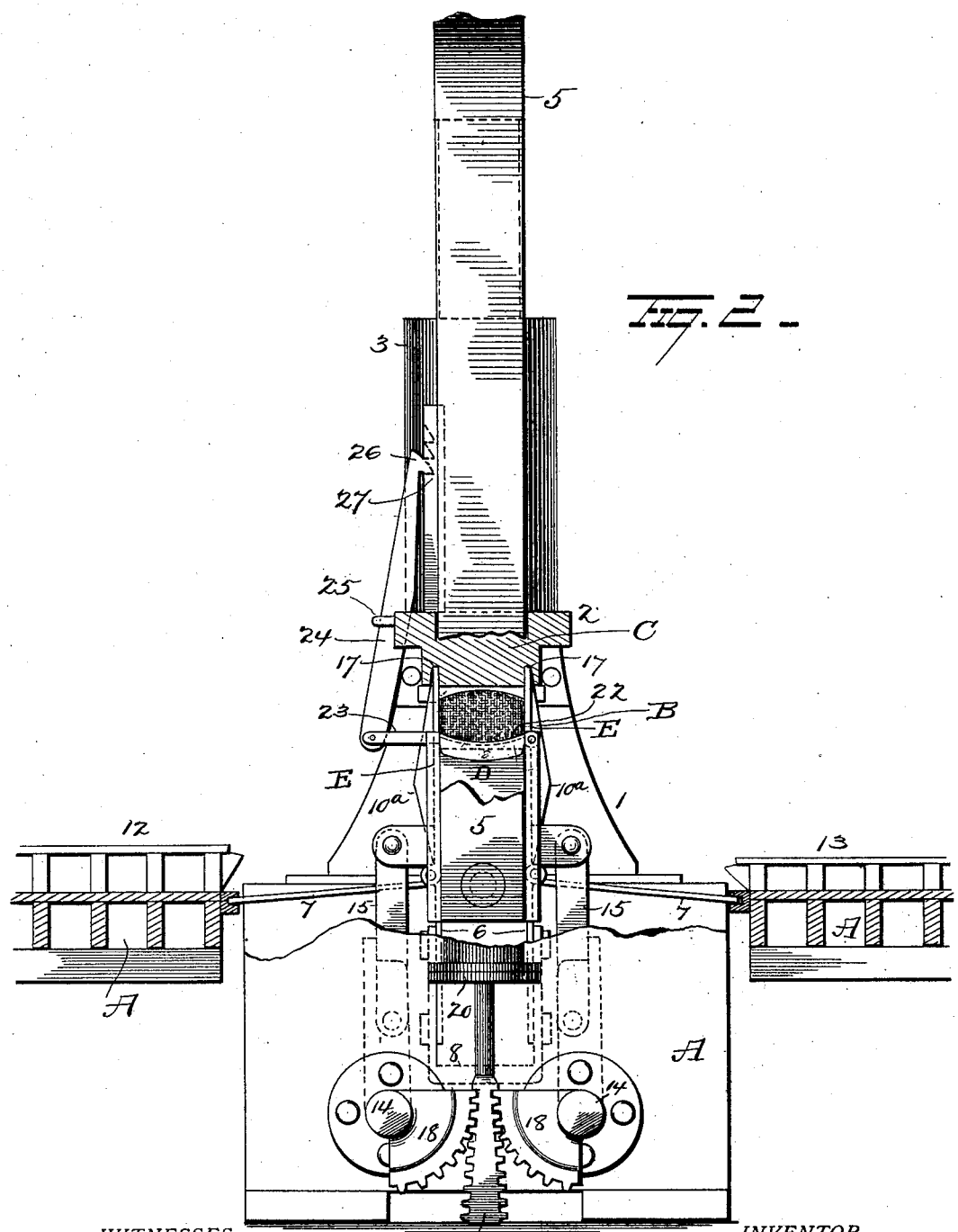

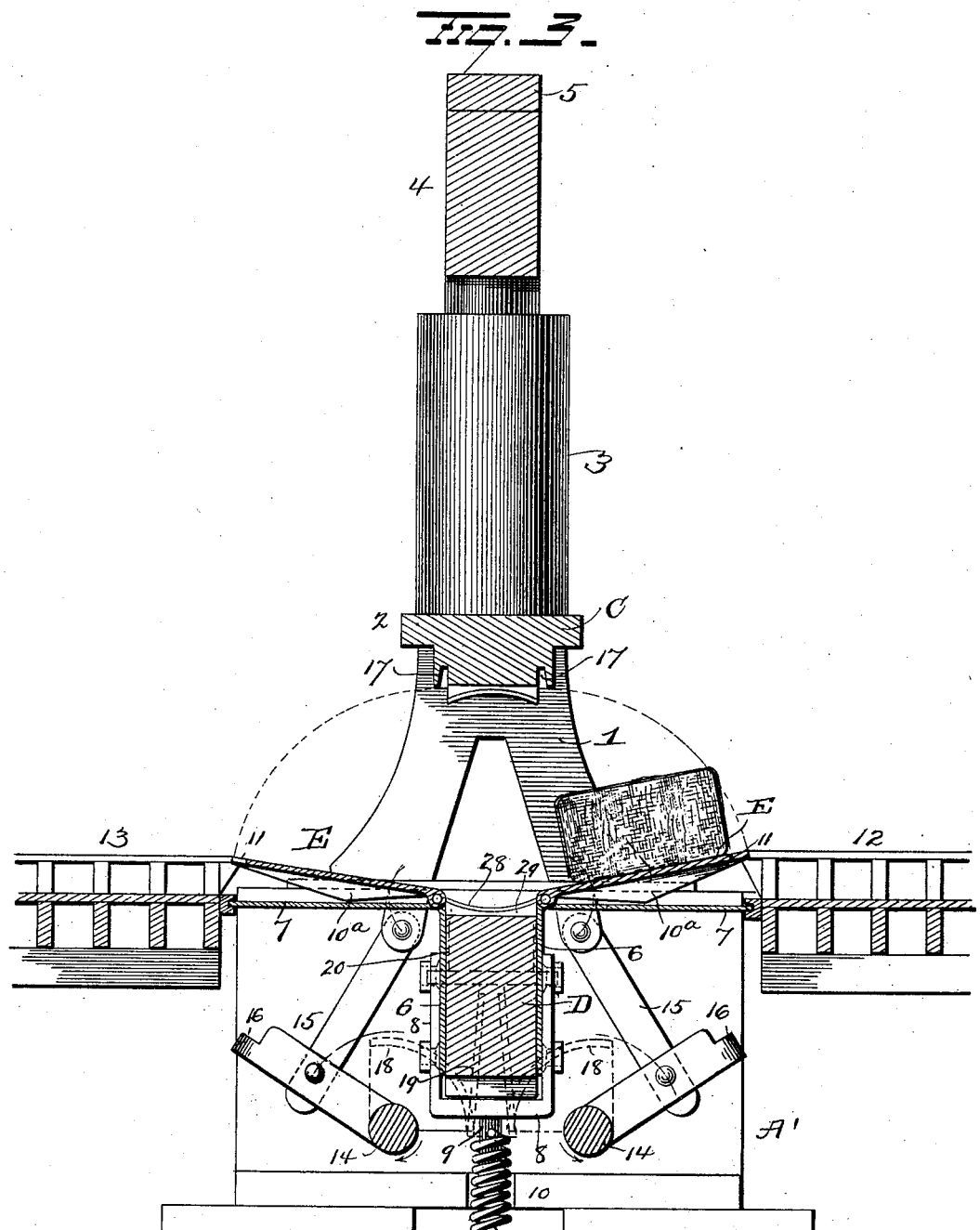

No. 759,399. PATENTED MAY 10, 1904.
J. L. SHEPPARD.
BALE COMPRESS.
APPLICATION FILED MAR. 31, 1900.
NO MODEL. 4 SHEETS—SHEET 4.
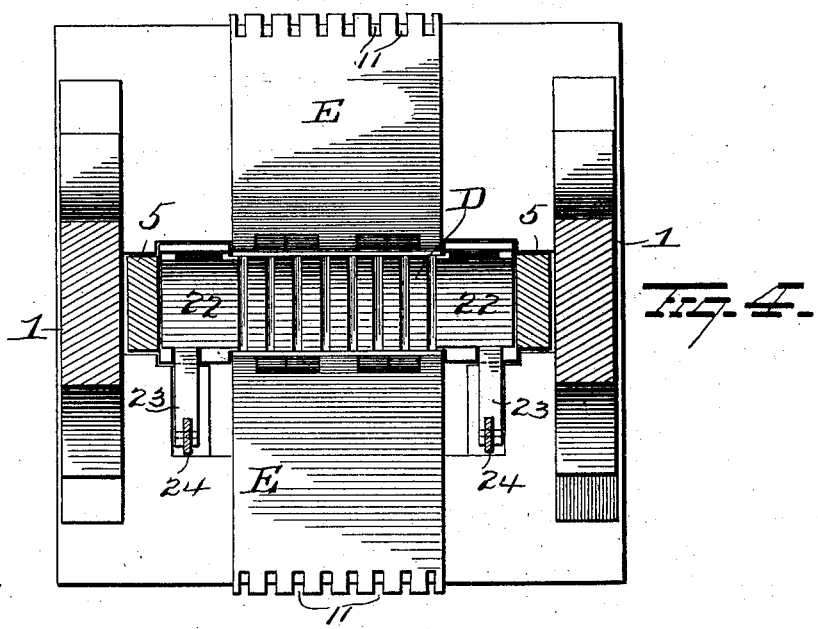
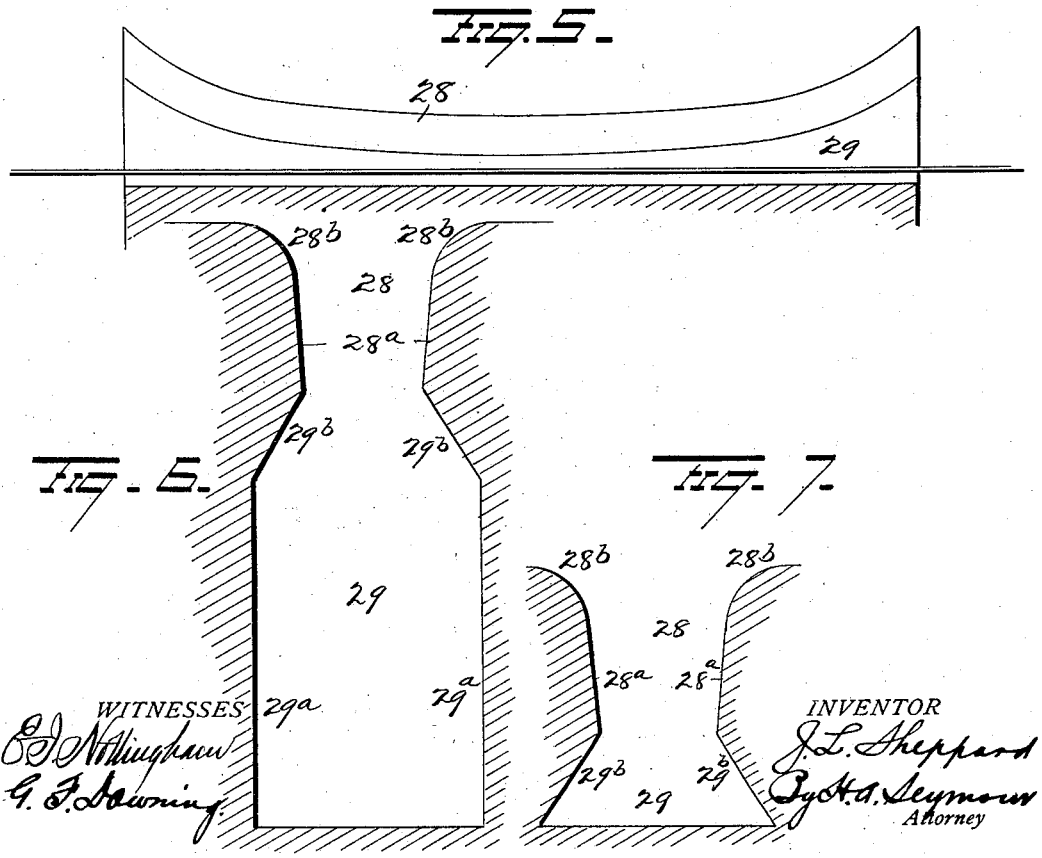

No. 759,399. Patented May 10, 1904.

UNITED STATES PATENT OFFICE.

JOHN L. SHEPPARD, OF CHARLESTON, SOUTH CAROLINA.

BALE-COMPRESS.

SPECIFICATION forming part of Letters Patent No. 759,399, dated May 10, 1904.

Application filed March 31, 1900. Serial No. 11,002. (No model.)

*To all whom it may concern:*

Be it known that I, JOHN L. SHEPPARD, of Charleston, in the State of South Carolina, have invented certain new and useful Improvements in Bale-Compresses; and I do hereby declare the following to be a full, clear, and exact description of the invention, such as will enable others skilled in the art to which it appertains to make and use the same.

My invention relates to an improvement in compresses for cotton or other bales.

In putting an uncompressed bale into the compress nearly all of the bands which the planter has put on such bale have to be removed, and hence there is in the compress a huge mass of cotton not properly held in shape. To get the bale into a compress as heretofore constructed involves an outlay of time and skill; otherwise it is liable to be broken up or the layers are disturbed. Often when the power is applied to such bales they will buckle or bulge and lose their proper form. The planters put bagging above and below in making up their bales, the amount around the bale being ninety inches. When these bales are properly compressed, either between the curved or the straight-faced platens, they are often reduced to a form which measures less than sixty inches around, seldom in good compresses more than seventy inches. This being so, there is accumulated on the two uncompressed or exposed sides a surplus of twenty to thirty inches of bagging. This material not being subjected to the direct pressure or power of the compress is, with the cotton behind it, a great obstacle in the way of good work, as it being of a soft springy nature—that is to say, not as solid as the balance of the compressed bale—it is hard to tie the bands around this surplus bagging or material closely. The work of pulling out the slack of the bands is very laborious and for this reason is poorly and incompletely performed by the men assigned to this duty.

It is the object of my present invention to overcome the difficulties above mentioned and to so compress a bale that it shall occupy a minimum amount of space and be of uniform density throughout and uniform width in every bale.

A further object is to provide an apparatus for the purpose above stated which shall be simple in construction and which shall perform its function in an accurate and effectual manner.

With these objects in view the invention consists in certain novel features of construction and combinations and arrangements of parts, as hereinafter set forth, and pointed out in the claims.

In the accompanying drawings, Figure 1 is a view of a compress embodying my improvements. Fig. 2 is a side elevation partly in section. Fig. 3 is a vertical sectional view. Fig. 4 is a transverse section. Figs. 5, 6, and 7 are enlarged detail views of portions of one of the platens and illustrating the grooves therein.

For the accomplishment of the object sought and as hereinbefore expressed I propose to employ two iron-hinged sides properly constructed and arranged to withstand the lateral pressure exerted by the bale while it is being compressed. These hinged sides serve to take the uncompressed bale from a platform into the press and confine it between themselves, after which said iron sides become locked at their upper ends to the upper platen. Thus the bale is held or inclosed in a four-sided mold. Power being applied to the compress, the lower platen moves upward between the said sides or iron walls, and all that is compressible in the bale is reduced to the smallest size. When the bale is thus reduced in size or compressed, the iron sides will be caused to return to their first position. The bands will now be passed around the bales and fastened snugly.

A represents the floor of the compress, and B a framework comprising standards 1 and a cross-head 2. Against the under side of the cross-head the upper stationary platen C is rigidly secured, and upon the cross-head hydraulic rams 3 are located. The head 4 of a yoke 5 rests upon or is secured to the upper ends of the plungers of the rams, and the vertical parallel members of this yoke depend through suitable slots or openings in the framework, the lower ends of said parallel members of the yoke being secured to the lower movable platen D. The lower platen (which is preferably made of greater depth than the upper platen) is adapted to move between two plates 6 6, and these plates are themselves movable vertically between guide-blocks 6ª, secured to the lower platen, said plates being hinged at their upper ends to horizontal plates 7 7, the outer ends of which latter have hinged connection with the floor. The lower ends of the plates 6 are connected by a cross-bar 8, disposed below the lower platen D and provided with a depending shank 9 for the accommodation of a spring 10, which acts to maintain the plates 6 and attached parts normally in and return them to their normal positions in case the weight of these parts fails to cause them to return.

At the juncture of each pair of plates 6 7 an iron side or wing E is hinged, each side or wing being provided with suitable braces 10ª and at its upper edge with a series of notches 11, adapted to aline with the grooves in the upper platen for the accommodation of the tie-bands. These notches may or may not be used.

Normally when the compress is open for the reception of a bale the sides or wings E are disposed in a position slightly inclined from the horizontal, and their free edges rest on the inner ends of platforms 12 13, the platform 12 at the side where the bale enters the compress being of a width equal to the standard length of a bale.

In suitable framework A' below the compress-floor A two shafts 14 are disposed, one at each side of the line of movement of the lower platen. Each of these shafts is connected, by means of two toggle-levers 15, with the respective sides or wings, and these toggle-levers are so arranged that during the first part of their movement when the shafts 14 are turned the sides or wings E will be raised to a vertical position, so as to bear against the sides of the uncompressed bale between them, with their upper edges engaging the upper platen, near the lower edges thereof. During the continued movement of the toggle-levers and until the members of said levers move sufficiently far to bring their pivotal points slightly out of alinement (their further movement being prevented by the engagement of a stop 16 on one member with the other member) the upper ends of said iron sides or wings will move into grooves or recesses 17 in the upper platen, and thus be effectually locked against outward movement.

In feeding the uncompressed bale to the compress it is first placed upon the platform 12, from which it will be moved upon the adjacent side or wing. The toggle-lever will now be operated in a manner presently explained to raise the sides or wings E, as before explained, and the uncompressed bale will be accurately and quickly discharged onto the lower platen and closely confined between said sides or wings. During a part of the movement of the sides or wings the bale will offer little or no resistance to the wings; but as the bale will probably be a little too wide on account of the looseness of the material (or the bale may be wider than usual) it will offer more or less resistance to the sides or wings as they approach their vertical positions to engage and be locked to the upper platen. In constructing the devices for operating the sides or wings provision has been made to increase the power applied to said sides or wings as they approach their vertical or closed positions. The means which may be employed for applying power to the operating devices for the sides or wings will now be described. Each shaft 14 is provided with a toothed sector 18 and these sectors are arranged eccentrically to the shafts. Between these sectors a double rack-bar 19 is disposed. This rack-bar is tapering, with the teeth at its larger end normally in mesh with the respective sectors when the sides or gates are open. The rack-bar is operated, preferably, by means of a hydraulic ram 20. It will be readily seen that as the sectors are eccentrically disposed and as the rack-bar is tapering the leverage will increase as the rack-bar passes between the sectors, and consequently the power applied to the sides or gates E will increase as they reach their closed positions for the purpose hereinbefore explained.

Ejector-blocks 22 are hinged at one edge on the respective ends of the lower platen, and each of these blocks is provided at its free edge with an arm 23, projecting toward the inlet side of the apparatus. To the free ends of arms 23 bars 24 are pivoted and extend upwardly through suitable guides 25. The bars 24 are provided at their upper ends with teeth 26, and said bars 24 are of such length as to extend to ratchet-bars 27, attached to the rams 3, when the lower platen is raised to compress a bale, so as to permit the teeth at the upper ends of said bars to engage said ratchet-bars.

Assuming now that the bale has been compressed to the desired extent, the sides or gates will be lowered and the tie-bands will be applied to the compressed bale. After this has been done the lower platen will be lowered. As the lower platen descends the ejector-blocks 22 will be raised and act to discharge the compressed bale onto the platform 13. Before the lower platen reaches its normal position and when the ejector-blocks cannot be further raised the continued downward movement of said lower platen will cause the inner edges of the bars 24 to engage the inner walls of their guides, on which they will for an instant be fulcrumed, to cause the upper ends of said bars to be moved outwardly as the lower platen approaches its normal position to effect the engagement of the bars 24 from the ratchet-bars, thereby permitting the ejector-blocks to drop to their normal positions. The compress is now ready to receive another uncompressed bale.

I prefer to use with my apparatus platens having concave faces, because by such construction they will be made to partially embrace the bale, and thus assist in preventing bulging of the bale when the sides or gates are removed. These platens are provided with grooves for the accommodation of tie-bands. With the undercut grooves heretofore employed the cotton is liable to become wedged in them. To avoid this, I prefer to make the tie-band grooves as shown in Figs. 5, 6, and 7. The mouth 28 of each groove is made approximately V-shaped—that is to say, it has divergent walls 28$^a$, and these walls are curved at their outer edges, as shown at 28$^b$. The inner or smaller portion of the mouth 28 of each groove communicates with an inner enlarged portion 29, which extends straight across the platen, as shown in Fig. 5. As the platen has a concave face and as the portions 29 of the tie-band grooves are made straight across the platen, the depth of the portion 29 of each groove will vary from its center toward its ends. Thus the portion 29 of each groove will be quite deep at the edges of the platen and has straight parallel walls 29$^a$, and the walls near the outer edge of the portions 29 converge, as at 29$^b$, to the smaller inner end of the mouth 28. The parallel walls 29$^b$ will decrease in depth toward the center of the platen, and exactly in the center the vertical walls 29$^a$ will disappear and the portion 29 of the groove will have only the convergent walls 29$^b$, as shown in Fig. 7. The cotton will never penetrate the tie-band grooves more than one and a quarter inches, and the V-shaped mouth of each groove is made approximately this depth, although they may be made deeper, if desired. The mouths of the tie-band grooves being made V-shaped, the cotton which may enter the grooves during the compressing of a bale will freely leave them when the pressure is removed, and thus there is no liability of the cotton being cut or of its sticking in and clogging the grooves.

My improvements, though simple, are very effectual in the performance of their functions, and by means of them I am enabled to quickly compress a bale to such extent that it will occupy very small space. This is a very important consideration in the matter of shipping, and its successful accomplishment has been very much sought after.

My improvement can be applied to compresses now in use.

Various slight changes might be made in the details of construction of my invention without departing from the spirit thereof or limiting its scope, and hence I do not wish to limit myself to the precise details herein set forth.

Having fully described my invention, what I claim as new, and desire to secure by Letters Patent, is—

1. In a bale-compress, the combination with a movable and a fixed platen, of sides or wings hinged adjacent to the normal position of the movable platen, means for moving said sides or wings so that their free ends will engage the fixed platen, said means also constructed and arranged to raise said sides or wings and means coöperating with the sides or wings to lock them to the fixed platen.

2. In a bale-compress, the combination with the platens, of sides or wings hinged at respective sides of the lower platen and means for raising said sides or wings, said fixed platen having means coöperating with said sides or wings to quickly and securely lock them to the sides of the upper platen to confine the bale between them.

3. In a bale-compress, the combination with the platens, of sides or gates hinged at respective sides of the lower platen, and means for turning said sides or plates on their hinges to bring them to a position at right angles to the faces of the platens and then raising said sides or wings vertically and means coöperating with the sides or wings to lock them securely to the upper platen.

4. In a bale-compress, the combination with framework and platens, of plates disposed at respective sides of the lower platen, gates hinged to the inner ends of said plates adjacent to the lower platen, and means for moving the gates to a vertical position and then raising said hinged plates to raise the gates vertically and means coöperating with the sides or wings to effect their locked engagement with the upper platen.

5. In a bale-compress, the combination with framework, an upper fixed platen and a lower movable platen, of vertically-movable plates disposed alongside the lower platen, sides or wings hinged at the upper ends of said plates and means for moving the sides or wings to a vertical position and subsequently moving said plates upward vertically and means coöperating with the sides or wings to lock them to the upper platen.

6. In a bale-compress, the combination with framework, an upper fixed platen having grooves or recesses in proximity to its side edges, and a movable lower platen, of hinged sides or plates and means for raising said sides or plates to inclose the bale and for moving their upper ends into the grooves in the upper platen.

7. In a bale-compress, the combination with framework, an upper fixed platen, and a lower movable platen, of sides or wings hinged at their lower or inner edges at respective sides of the lower platen and adapted to receive a bale thereon, means for raising the sides or wings to discharge an uncompressed bale onto the lower platen, means coöperating with said sides or wings to effect their locked engagement with the upper platen to maintain them in a vertical position with the bale confined between them.

8. In a bale-compress, the combination with framework, an upper fixed platen and a lower movable platen, of vertically-movable plates at respective sides of the lower platen, a spring for maintaining said plates in and returning them to their lowest position, sides or wings hinged at the upper ends of said plates, toggle-levers connected with said sides or wings near their hinged ends, and means for operating said toggle-levers to raise the sides or wings to inclose a bale for raising said plates to raise the sides or wings and means coöperating with the sides or wings to effect their locked engagement with the upper platen.

9. In a bale-compress, the combination with framework and upper and lower platens, of hinged sides or gates for confining a bale between them, and means for raising the sides or wings to inclose the bale, and variable-power mechanism to increase the power or leverage to the sides or wings as the latter approach vertical parallel positions, thus effecting reduction to standard width of bales in excess of such width.

10. In a bale-compress, the combination with framework and an upper and a lower platen, of hinged wings adapted to confine a bale between them, toggle-levers having one member attached to said sides or wings, shafts to which the other members of the toggle-levers are connected, eccentric toothed segments secured to said shafts, a tapering rack-bar disposed between said segments and meshing with both and means for moving said rack-bar longitudinally.

11. In a bale-compress, the combination with framework, a fixed platen and a movable platen, of ejector-blocks hinged to one platen, fixed ratchet-bars, attached at one end to the ejector-blocks and provided at their free ends with teeth to engage said ratchet-bars when the platens approach each other and to move said blocks to eject the bale when the platens recede from each other and then disengaged from said ratchet-bars to permit the ejector-blocks to return to their normal positions.

12. In a bale-compress, the combination with framework, an upper fixed platen and a lower movable platen, of sides or wings hinged at the sides of the lower platen, means for raising said sides or wings into engagement with the upper platen, provided with means coöperating with said sides or wings to lock their upper free ends to the upper platen, and fluid-pressure means for forcing the lower platen up between the hinged sides or wings which confine a bale between them.

13. In a bale-compress, a platen having elongated V-shaped grooves in its face for the passage of bands, each of said grooves having outwardly-flaring walls.

14. In a bale-compress, a platen having a concave face, said platen having elongated straight grooves, each of said grooves having a mouth or outlet provided with divergent walls.

In testimony whereof I have signed this specification in the presence of two subscribing witnesses.

JOHN L. SHEPPARD.

Witnesses:
R. L. GILLILAND,
H. LAURENS HASELL.